United States Patent
Quach et al.

(10) Patent No.: US 10,445,603 B1
(45) Date of Patent: Oct. 15, 2019

(54) SYSTEM FOR CAPTURING A DRIVER IMAGE

(71) Applicant: Lytx, Inc., San Diego, CA (US)

(72) Inventors: Quoc Chan Quach, San Diego, CA (US); Phillip Podlevsky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 114 days.

(21) Appl. No.: 14/966,503

(22) Filed: Dec. 11, 2015

(51) Int. Cl.
| | |
|---|---|
| *B60R 11/04* | (2006.01) |
| *G06K 9/00* | (2006.01) |
| *G07C 5/08* | (2006.01) |
| *G10L 17/22* | (2013.01) |
| *B60R 11/00* | (2006.01) |

(52) U.S. Cl.
CPC .......... *G06K 9/00845* (2013.01); *B60R 11/04* (2013.01); *G07C 5/085* (2013.01); *G10L 17/22* (2013.01); *B60R 2011/0003* (2013.01)

(58) Field of Classification Search
CPC .... G06K 9/00845; B60R 11/04; G07C 5/085; G10L 17/22
See application file for complete search history.

(56) References Cited

U.S. PATENT DOCUMENTS

| | | | | |
|---|---|---|---|---|
| 5,808,197 | A * | 9/1998 | Dao | G01C 9/00 188/181 A |
| 6,400,835 | B1 * | 6/2002 | Lemelson | B60Q 1/0023 307/10.5 |
| 7,602,947 | B1 * | 10/2009 | Lemelson | B60Q 1/0023 340/426.1 |
| 8,064,650 | B2 * | 11/2011 | Webb | H04N 5/23219 382/118 |
| 8,606,492 | B1 * | 12/2013 | Botnen | G07C 5/008 701/123 |
| 8,620,487 | B2 * | 12/2013 | Cochran | G07C 9/00087 340/5.2 |
| 8,863,256 | B1 * | 10/2014 | Addepalli | H04W 4/046 726/7 |
| 8,988,188 | B2 * | 3/2015 | Chang | G07C 9/00563 340/5.53 |
| 9,576,189 | B2 * | 2/2017 | Lim | G06K 9/0221 |
| 2006/0072792 | A1 * | 4/2006 | Toda | B60R 25/1004 382/115 |
| 2006/0261931 | A1 * | 11/2006 | Cheng | B60R 25/102 340/426.1 |
| 2006/0271286 | A1 * | 11/2006 | Rosenberg | G01C 21/3647 701/431 |
| 2006/0277043 | A1 * | 12/2006 | Tomes | G10L 17/04 704/247 |
| 2008/0300755 | A1 * | 12/2008 | Madau | B60R 1/00 701/49 |
| 2009/0237226 | A1 * | 9/2009 | Okita | B60W 10/184 340/435 |

(Continued)

*Primary Examiner* — Gims S Philippe
*Assistant Examiner* — Stefan Gadomski
(74) *Attorney, Agent, or Firm* — Van Pelt, Yi & James LLP

(57) ABSTRACT

A system for capturing an image of a driver includes an input interface and a processor. The input interface is to receive sensor data associated with a vehicle. The processor is to determine whether to capture a driver image based at least in part on the sensor data and, in the event it is determined to capture the driver image, to indicate to capture the driver image.

18 Claims, 7 Drawing Sheets

(56) References Cited

U.S. PATENT DOCUMENTS

| | | | |
|---|---|---|---|
| 2010/0033570 A1* | 2/2010 | Plaster | B60R 1/00 348/148 |
| 2010/0188494 A1* | 7/2010 | Mukai | H04N 7/18 348/77 |
| 2011/0025529 A1* | 2/2011 | Uechi | G08G 1/096783 340/905 |
| 2011/0249144 A1* | 10/2011 | Chang | G06F 17/30259 348/231.3 |
| 2012/0054845 A1* | 3/2012 | Rodriguez | G06F 21/316 726/7 |
| 2012/0148117 A1* | 6/2012 | Chang | G06K 9/00221 382/118 |
| 2013/0073114 A1* | 3/2013 | Nemat-Nasser | B60W 40/09 701/1 |
| 2013/0195316 A1* | 8/2013 | Bataller | G06K 9/00255 382/103 |
| 2013/0232142 A1* | 9/2013 | Nielsen | G06Q 30/02 707/736 |
| 2014/0121927 A1* | 5/2014 | Hanita | B60T 7/14 701/70 |
| 2014/0240092 A1* | 8/2014 | Nielsen | G05B 1/00 340/5.81 |
| 2014/0358427 A1* | 12/2014 | Fuhrman | G01C 21/3602 701/452 |
| 2015/0116493 A1* | 4/2015 | Bala | G06K 9/00845 348/148 |
| 2015/0142285 A1* | 5/2015 | Nagata | B60W 30/143 701/70 |
| 2015/0143492 A1* | 5/2015 | Berry | H04L 65/403 726/7 |
| 2015/0183409 A1* | 7/2015 | Lee | B60T 7/12 701/70 |
| 2015/0186714 A1* | 7/2015 | Ren | G06K 9/00369 348/77 |
| 2015/0221341 A1* | 8/2015 | Akay | H04N 5/77 386/278 |
| 2015/0232026 A1* | 8/2015 | Lueke | B60Q 9/00 701/1 |
| 2015/0235485 A1* | 8/2015 | Nemat-Nasser | G07C 5/08 701/1 |
| 2015/0239397 A1* | 8/2015 | Smith, Sr. | H04N 5/77 386/226 |
| 2015/0379331 A1* | 12/2015 | Nemat-Nasser | G06K 9/00845 382/118 |
| 2016/0063235 A1* | 3/2016 | Tussy | G06F 21/32 726/6 |
| 2016/0101783 A1* | 4/2016 | Abou-Nasr | B60W 40/08 340/5.82 |
| 2016/0104050 A1* | 4/2016 | Bogner | B60T 7/14 701/70 |
| 2016/0139594 A1* | 5/2016 | Okumura | B60W 30/00 701/2 |
| 2016/0171319 A1* | 6/2016 | Nagai | G06K 9/00 382/103 |
| 2016/0214619 A1* | 7/2016 | Na | B60W 10/20 |
| 2016/0229413 A1* | 8/2016 | Morley | B60K 28/063 |
| 2016/0301842 A1* | 10/2016 | Intagliata | B60R 1/00 |
| 2016/0318523 A1* | 11/2016 | Kim | B60W 30/18018 |
| 2016/0339959 A1* | 11/2016 | Lee | B62D 15/0265 |
| 2016/0362050 A1* | 12/2016 | Lee | B60R 1/00 |
| 2016/0371707 A1* | 12/2016 | McLean | G06Q 30/0201 |
| 2017/0001648 A1* | 1/2017 | An | B60W 30/08 |
| 2017/0021835 A1* | 1/2017 | Kojima | B60W 30/18 |
| 2017/0036673 A1* | 2/2017 | Lee | A61B 3/112 |
| 2017/0116465 A1* | 4/2017 | Ma | G06K 9/00288 |
| 2017/0140232 A1* | 5/2017 | Banno | G06K 9/00845 |
| 2017/0161575 A1* | 6/2017 | Banno | G06K 9/00845 |
| 2017/0264797 A1* | 9/2017 | Trinh | H04N 5/2253 |

\* cited by examiner

SYSTEM FOR CAPTURING A DRIVER IMAGE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. However, it is important to be able to associate the sensor data with a driver.

BRIEF DESCRIPTION OF THE DRAWINGS

Various embodiments of the invention are disclosed in the following detailed description and the accompanying drawings.

DETAILED DESCRIPTION

Figure 1:
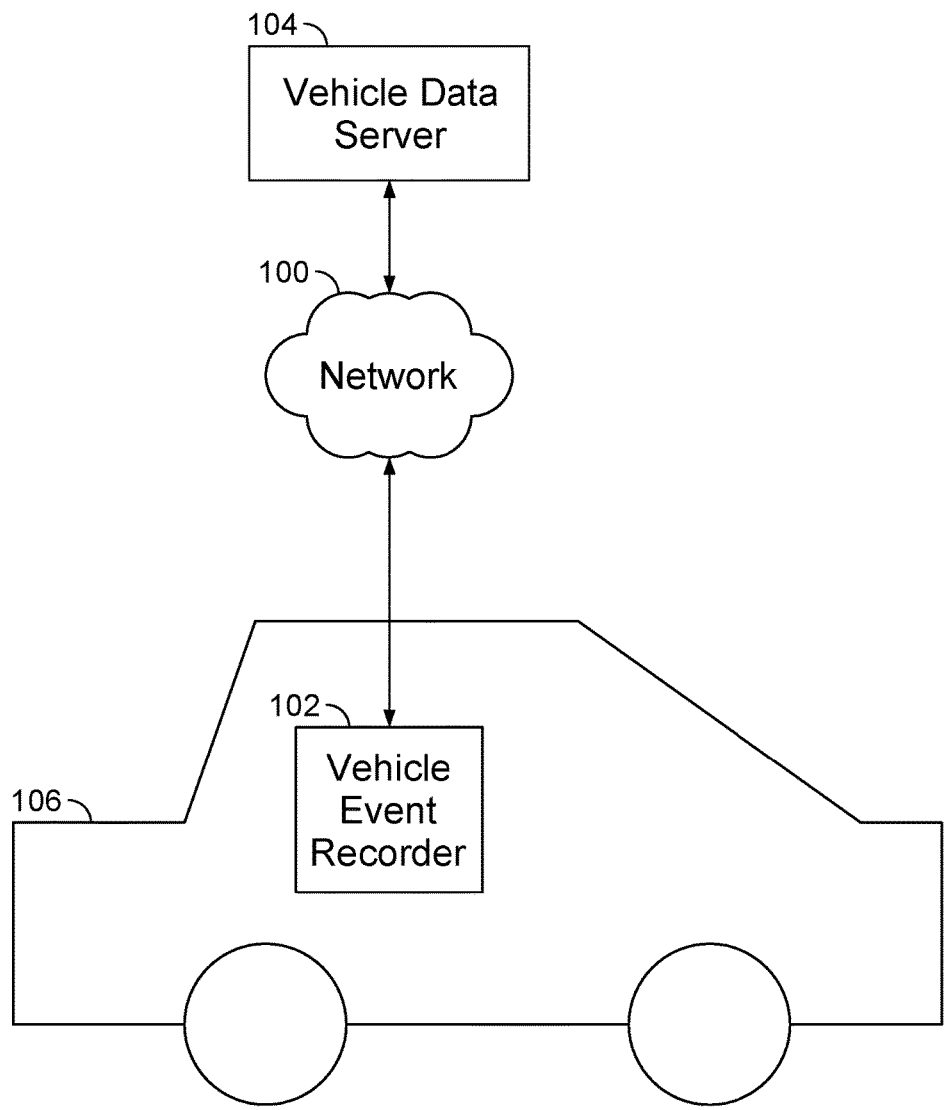
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for capturing a driver image comprises an input interface for receiving sensor data associated with a vehicle, and a processor for determining whether to capture a driver image based at least in part on the sensor data, and in the event it is determined to capture the driver image, indicating to capture the driver image. In some embodiments, the processor is coupled to a memory, which is configured to provide the processor with instructions.

In some embodiments, a system for capturing a driver image comprises a vehicle event recorder comprising a processor and a memory. The vehicle event recorder is coupled to a set of sensors (e.g., audio sensors, video sensors, accelerometers, gyroscopes, global positioning system sensors, vehicle state sensors, etc.) including an inward-facing camera mounted on or in the vicinity of the rear-view mirror (e.g., at the top middle of the windshield, to the right of the driver). In some embodiments, the vehicle event recorder sits on the dashboard. The system for capturing a driver image captures images. In some embodiments, the driver image is used to identify the driver. In some embodiments, capturing the driver image and/or subsequent processing comprises a substantial load on the vehicle event recorder. Driver images therefore cannot be recorded and processed continuously. Driver images used for identification have the highest probability of success (e.g., accurate identification of the driver) when the driver is looking in the direction of the camera, thus driver images should be captured when there is a high probability that the driver is looking in the direction of the camera (e.g., to the right). In some embodiments, sensor data is used to determine when the driver is likely to be looking to the right (e.g., is changing lanes to the right, is reversing, is parking, is pulling over to a shoulder, etc.), and in the event the driver is likely to be looking to the right, an indication is provided to the camera to increase resources towards capturing an image. This may include capturing an image, increasing image capture frequency, scanning a larger area of the image for a face, etc.—for example, the capture of images can go from lower frequency (e.g., once every second) to higher frequency (e.g., 5 times every second). In various embodiments, it is determined that the driver is likely to be looking to the right in the event the accelerometer data indicates the vehicle is turning to the right, in the event lane marker data (e.g., lane marker data captured from video data) indicates that the vehicle is turning to the right, in the event that turn signal data indicates a right turn and vehicle speed data indicates the vehicle is slowly moving or not moving, in the event that turn signal data indicates a left turn and vehicle speed data indicates the vehicle is slowly moving or not moving, or in any other appropriate situation. In some embodiments, the system uses audio data to aid driver identification.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, lane marker sensor, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for capturing a driver image.

Figure 2:
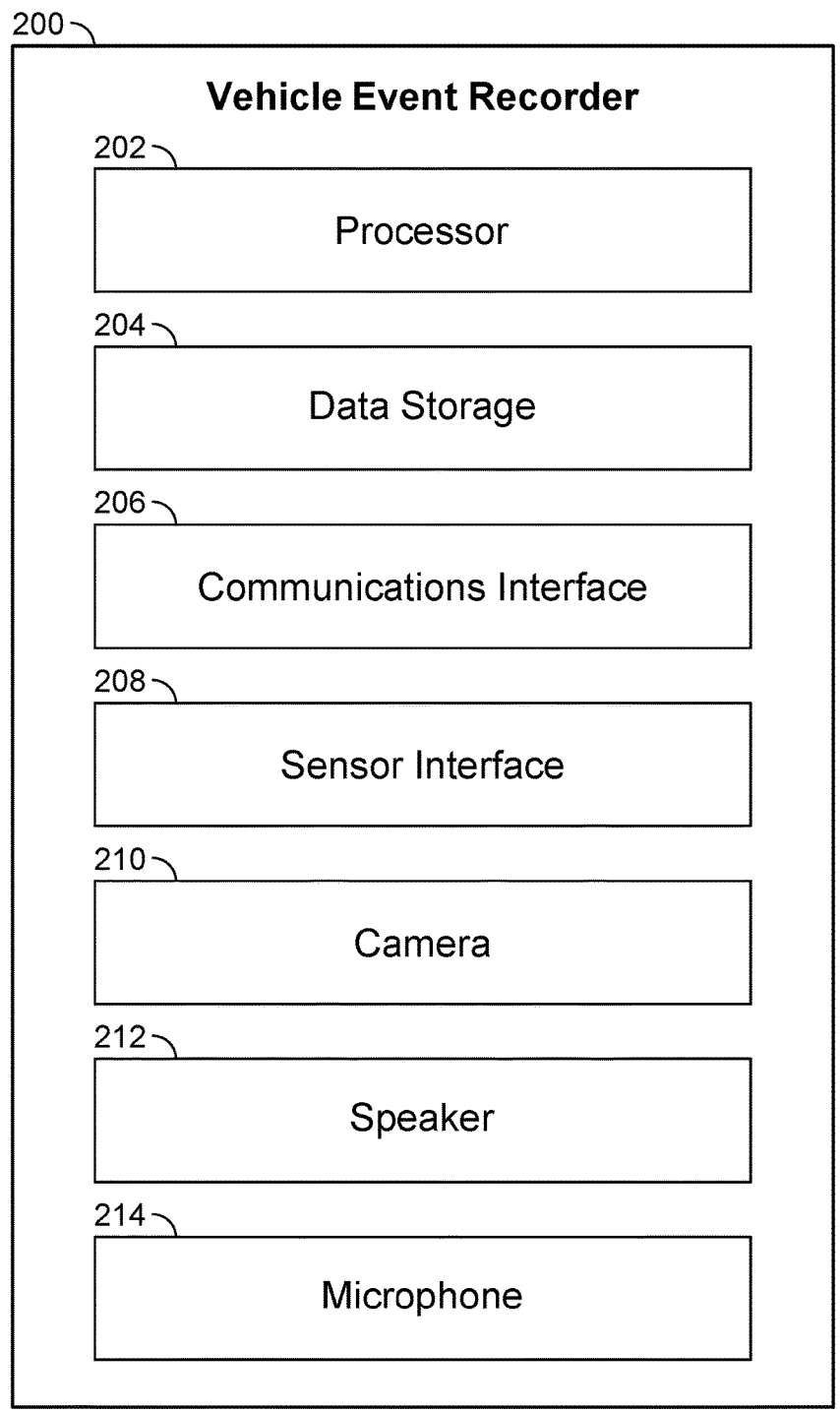
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, a speaker interface (e.g., for prompting a driver), or any other appropriate interface. Sensor interface 208 comprises an interface to one or more vehicle event recorder sensors. For example, sensor interface 208 interfaces with camera 210 (e.g., for taking an image of a driver, a lane, a road, etc.) and microphone 214 (e.g., for listening to a driver). In various embodiments, vehicle event recorder sensors comprise an external video camera, an external still camera, an internal video camera, an internal still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Figure 3:
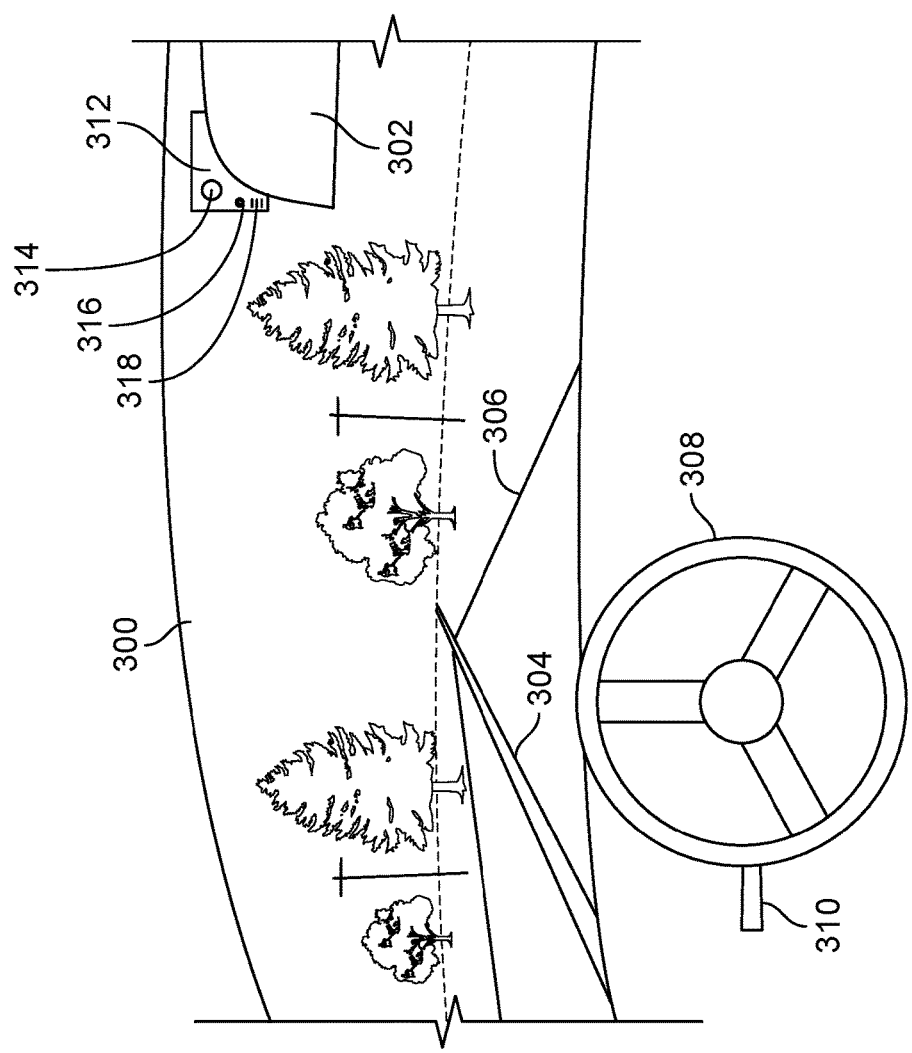
FIG. 3 is a diagram illustrating an embodiment of a vehicle cabin.

FIG. 3 is a diagram illustrating an embodiment of a vehicle cabin. In some embodiments, the diagram of FIG. 3 illustrates a driver view. In the example shown, a front view is seen via windshield 300 and a rear view is seen via rear view mirror 302. Through windshield 300 the driver is able to see the road, other cars, signs, stop lights, etc. Center line 304 and shoulder line 306 are visible to the driver through windshield 300. In some embodiments, center line 304 and shoulder line 306 comprise lane markers. In various embodiments, the driver uses the view of center line 304 and shoulder line 306 for determining a lane position, for guiding the path of a turn, for determining the legality of a lane change, or for any other appropriate purpose. In some embodiments, center line 304 and shoulder line 306 are visible to a forward facing camera (e.g., a forward facing camera communicating with sensor interface 208 of FIG. 2).

In various embodiments, a forward facing camera uses a view of center line 304 and shoulder line 306 for determining a lane position, for determining whether the vehicle is turning, for determining a driver steadiness (e.g., whether the driver drives steadily or weaves within the lane), or for any other appropriate purpose. Rear view mirror 302 comprises a mirror for providing a driver a rear view behind the vehicle. In some embodiments, a rear view is visible to a rearward facing camera (e.g., a rearward facing camera communicating with sensor interface 208 of FIG. 2). In some embodiments, a cabin view (e.g., a view of the interior of the vehicle cabin) is visible to an inward facing camera (e.g., an inward facing camera communicating with sensor interface 208 of FIG. 2). In some embodiments, an inward facing camera (e.g., with lens 314) as part of event recorder 312 is mounted to rear view mirror 302 (e.g., attached to rear view mirror 302 for the purpose of getting a good view of the cabin). In various embodiments, event recorder 312 is mounted on the windshield near the rearview mirror, mounted on the dashboard, or mounted in any other appropriate location. In some embodiments, an inward facing camera is used for capturing a driver image. In some embodiments, a driver image from an inward facing camera is used for driver identification (e.g., using facial recognition). In some embodiments, driver identification is more accurate (e.g., more likely to accurately identify the driver) in the event the driver image comprises the driver looking in the direction of the camera. In some embodiments, a driver image is captured, or is more frequently captured, or a larger area of the image is scanned for a face, in the event sensor data indicates the driver is likely to be looking in the direction of the camera (e.g., to the right). The vehicle cabin of FIG. 3 additionally comprises steering wheel 308 (e.g., for steering the vehicle) and turn signal indicator 310 (e.g., for indicating an intention to turn). In some embodiments, a driver is prompted to identify themselves via speaker 318 and recorded using microphone 316 for identification purposes.

Figure 4:
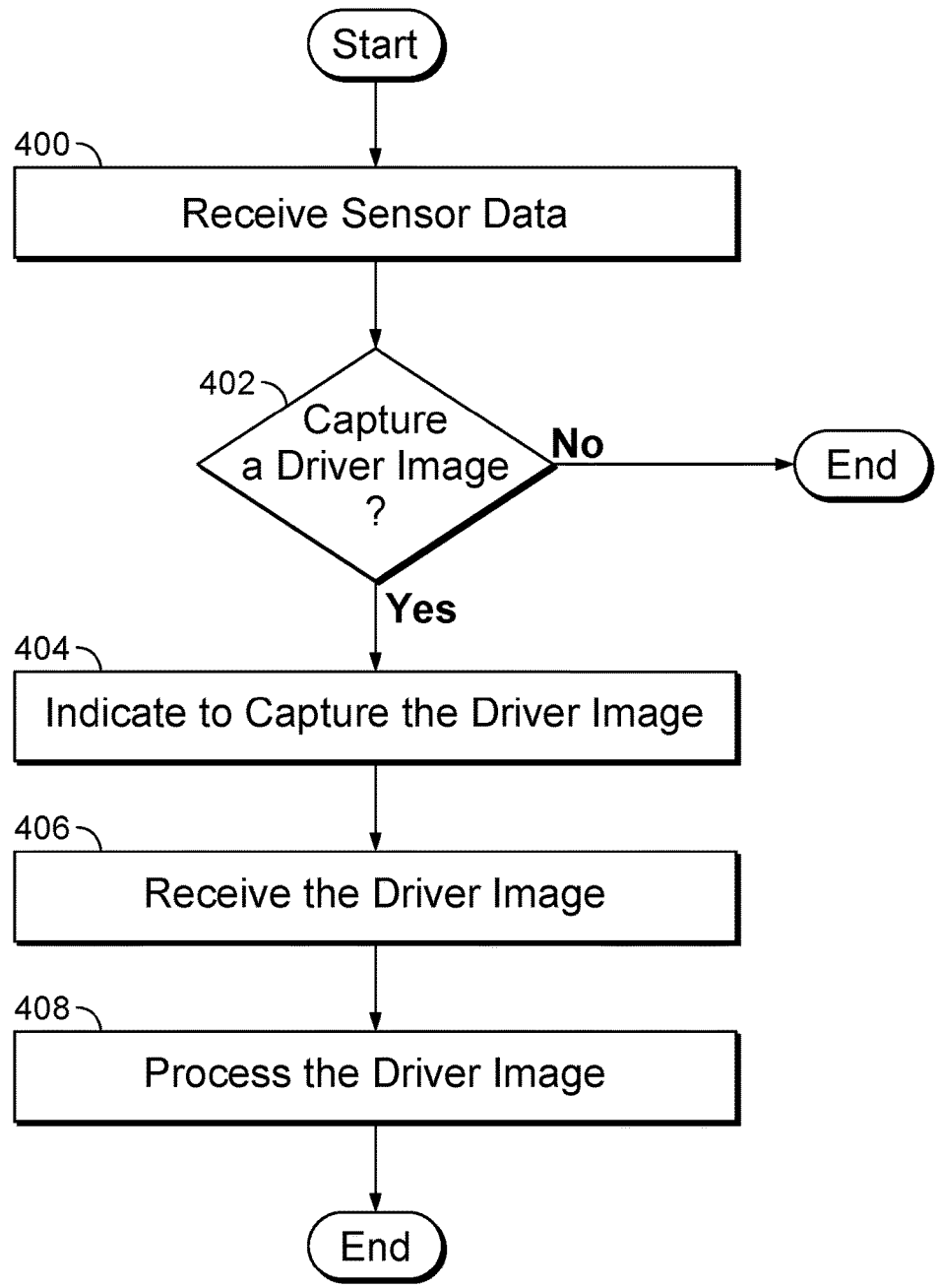
FIG. 4 is a flow diagram illustrating an embodiment of a process for capturing a driver image.

FIG. 4 is a flow diagram illustrating an embodiment of a process for capturing a driver image. In some embodiments, the process of FIG. 4 is executed by a vehicle event recorder (e.g., vehicle event recorder 102 of FIG. 1). In the example shown, in 400, sensor data is received. In various embodiments, sensor data comprises forward facing camera data, rearward facing camera data, inward facing camera data, audio data, still image data, video data, accelerometer data, GPS data, vehicle state sensor data, vehicle speed data, turn signal data, steering wheel data, lane marker data, speedometer data, or any other appropriate data. In 402, it is determined whether to capture a driver image. In some embodiments, it is determined whether to capture a driver image based at least in part on the sensor data. In some embodiments, it is determined whether to capture a driver image based at least in part on a likelihood that a driver is looking to the right. In various embodiments, it is determined whether to capture a driver image based at least in part on a likelihood that the vehicle is turning to the right, is changing lanes to the right, is reversing, is parking, is pulling over to a shoulder, or any other appropriate scenario. In the event it is determined that a driver image should not be captured, the process ends. In the event it is determined that a driver image should be captured, control passes to 404. In 404, the process indicates to capture the driver image. In some embodiments, an indication is provided to an inward facing camera to capture the driver image. In 406, the driver image is received (e.g., from the inward facing camera, e.g., via the sensor interface). In 408, the driver image is processed. In various embodiments, processing the driver image comprises storing the driver image, extracting facial recognition parameters on the driver image, performing driver identification on the driver image, uploading data, determining width of face, determining location of face within frame, determining quality/confidence of face features, counting the number of faces in the image, or performing any other appropriate processing. In some embodiments, instructions for the steps of the process of FIG. 4 are stored in a memory and provided for execution by a processor coupled to the memory. In various embodiments, the memory comprises a magnetic memory, a solid-state memory, an optical memory, or any other appropriate memory.

Figure 5:
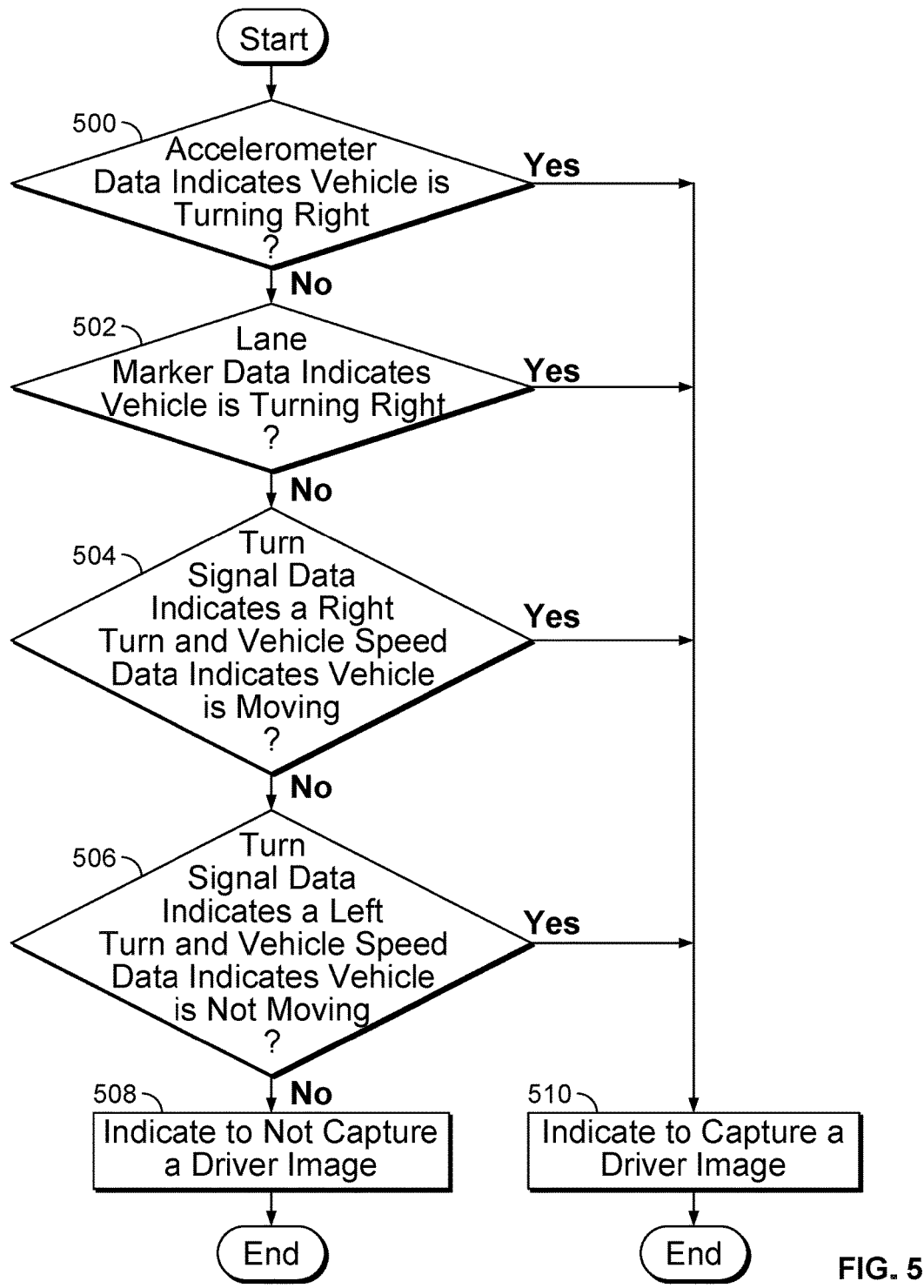
FIG. 5 is a flow diagram illustrating an embodiment of a process for determining whether to capture a driver image.

FIG. 5 is a flow diagram illustrating an embodiment of a process for determining whether to capture a driver image. In some embodiments, the process of FIG. 5 implements 402 of FIG. 4. In some embodiments, the process of FIG. 5 comprises a process for determining whether to capture a driver image based at least in part on sensor data. In various embodiments, sensor data comprises accelerometer data, lane marker data, turn signal data, vehicle speed data, gear information (including reverse gear), or any other appropriate data. In the example shown, in 500, it is determined whether accelerometer data indicates the vehicle is turning right. In the event it is determined that accelerometer data indicates the vehicle is turning right, control passes to 510. In the event it is determined that accelerometer data indicates the vehicle is not turning right, control passes to 502. In 502, it is determined whether lane marker data indicates the vehicle is turning or changing lanes to the right. In various embodiments, lane marker data is determined from video data (e.g., video data from a forward facing video camera), a vehicle lane detection data, a LIDAR data, or from any other appropriate data. In the event it is determined that lane marker data indicates the vehicle is turning right, control passes to 510. In the event it is determined that lane marker data does not indicate the vehicle is turning right, control passes to 504. In 504, it is determined whether turn signal data indicates a right turn and vehicle speed data indicates the vehicle is moving. In some embodiments, it is instead determined in 504 whether a turn signal data indicates a right turn and a vehicle speed data indicates the vehicle is slowly moving or not moving. In some embodiments, vehicle speed data comprises speedometer data (e.g., data from the vehicle speedometer). In some embodiments, turn signal data indicating a right turn and vehicle speed data indicating that the vehicle is moving together indicate that the vehicle is in the process of making a right turn and it is likely that the driver is looking right. In the event it is determined that turn signal data indicates a right turn and vehicle speed data indicates the vehicle is moving, control passes to 510. In the event it is determined not to be the case that turn signal data indicates a right turn and vehicle speed data indicates the vehicle is moving, control passes to 506. In 506, it is determined whether turn signal data indicates a left turn and vehicle speed data indicates the vehicle is not moving. In some embodiments, it is instead determined in 506 whether a turn signal data indicates a left turn and a vehicle speed data indicates the vehicle is slowly moving or not moving. In some embodiments, turn signal data indicating a left turn and vehicle speed data indicating that the vehicle is not moving together indicate that the vehicle is waiting to make a left turn and that the chances of the driver looking to the right (e.g., to watch for oncoming traffic) are elevated. In the event it is determined that turn signal data indicates a left turn and vehicle speed data indicates that the vehicle is not moving, control passes to 510. In the event it is determined not to be the case that turn signal data indicates a left turn and vehicle speed data indicates the vehicle is not moving, control passes to 508. In 508, it is indicated not to capture a driver image, and the process ends. In 510, it is indicated to capture a driver image. In various embodiments, the determinations of FIG. 5 are made in parallel instead of serially or in any combination of parallel and serial as appropriate.

Figure 6:
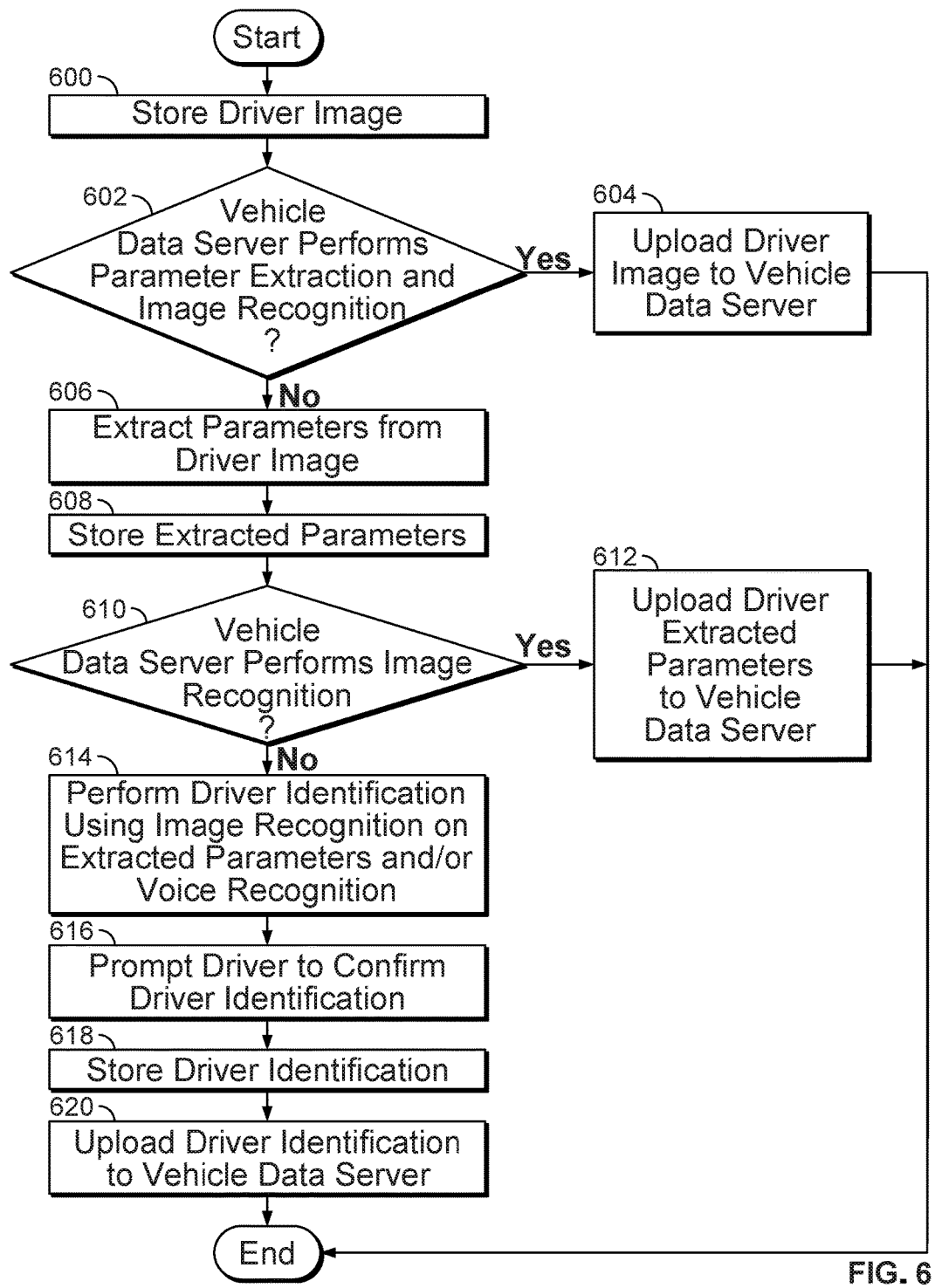
FIG. 6 is a flow diagram illustrating an embodiment of a process for processing a driver image.

FIG. 6 is a flow diagram illustrating an embodiment of a process for processing a driver image. In some embodiments, the process of FIG. 6 implements 408 of FIG. 4. In the example shown, in 600, the driver image is stored. In some embodiments, the driver image is stored in a data storage (e.g., data storage 204 of FIG. 2). In 602, it is determined whether a vehicle data server (e.g., vehicle data server 104 of FIG. 1) performs parameter extraction and image recognition (e.g., on the stored driver image). In some embodiments, due to privacy concerns, images are captured on the event recorder, features are extracted, and then in most cases only the features are sent to the vehicle data server; Note that the features cannot be reconstructed to reform the original image, thus preserving privacy. In some embodiments, the vehicle data server performs parameter extraction and image recognition in the event it is determined that parameter extraction and image recognition are more processing than the vehicle event recorder is able to perform. In the event it is determined that the vehicle data server does not perform parameter extraction and image recognition, control passes to 606. In the event it is determined that the vehicle data server performs parameter extraction and image recognition, control passes to 604. In 604, the driver image is uploaded to the vehicle data server, and the process ends. In 606, parameters are extracted from the driver image. In some embodiments, parameters comprise image recognition parameters. In various embodiments, image recognition parameters comprise distance from eye to eye, width of nose, distance from cheekbone to cheekbone, distance from nose to mouth, presence of a beard, eye color, hair color, or any other appropriate image recognition parameters. In 608, the extracted parameters are stored. In 610, it is determined whether the vehicle data server performs image recognition. In some embodiments, it is determined that the vehicle data server performs image recognition in the event it is determined that image recognition is more processing than the vehicle event recorder is able to perform. In the event it is determined that the vehicle data server does not perform image recognition, control passes to 614. In the event it is determined that the vehicle data server performs image recognition, control passes to 612. In 612, the extracted parameters are uploaded to the vehicle data server, and the process ends. In 614, driver identification is performed using image recognition on extracted parameters and/or voice recognition. In some embodiments, driver identification is performed using image recognition. In some embodiments, driver identification is based at least in part on the extracted parameters. In some embodiments, driver identification is based at least in part on voice recognition (e.g., using a recorded audio sample from the driver). In 616, the driver is prompted to confirm a driver identification. In some embodiments, driver identification confirmation is not performed (e.g., 616 is skipped). In various embodiments, the driver is prompted to push a button confirming or rejecting the accuracy of the driver identification, the driver is prompted to speak "yes" or "no" in order to confirm or reject the accuracy of the driver identification, the driver is prompted to speak his or her name in order to confirm the driver identification, or the driver is prompted to confirm the identification in any other appropriate way. In some embodiments, in the event the driver indicates (e.g., in response to the prompt) that the driver identification is incorrect, driver identification is repeated (e.g., the process returns to 614). In some embodiments, in the event that a number of attempts (e.g., 1, 2, 3, or N attempts) are incorrect, the extracted features and/or images (in the event that images are allowed) are sent back to the vehicle data server for processing. In some embodiments, in the event the driver indicates using his or her voice that the driver identification is incorrect, the repeated driver identification is based at least in part on voice identification of the driver voice. In 618, a driver identifier is stored. In 620, a driver identifier is uploaded to the vehicle data server. In various embodiments, a driver identifier, a driver image data, and/or a driver image parameters is/are stored associated with a trip data or a set of trip data.

Figure 7:
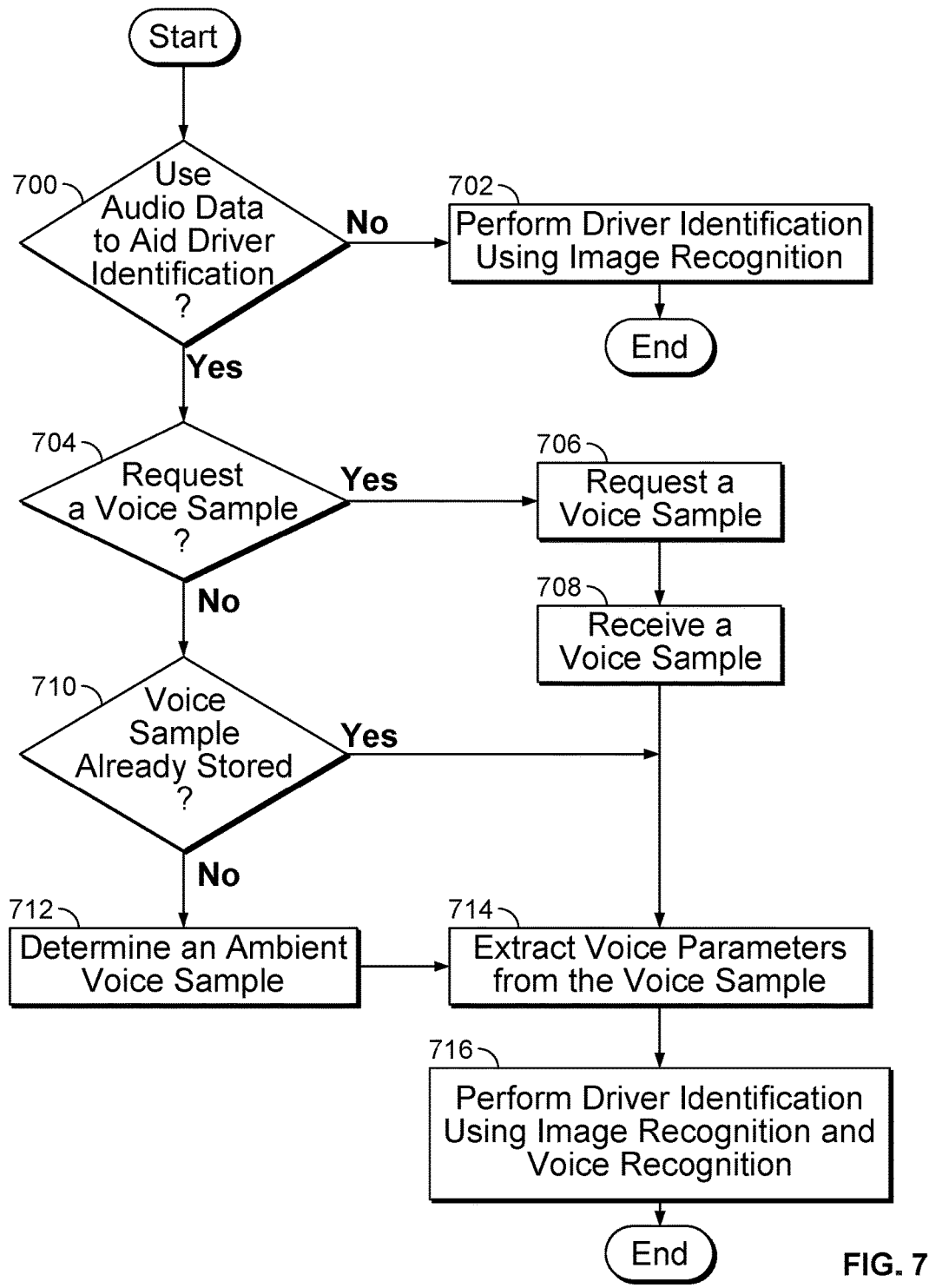
FIG. 7 is a flow diagram illustrating an embodiment of a process for performing driver identification.

FIG. 7 is a flow diagram illustrating an embodiment of a process for performing driver identification. In some embodiments, the process of FIG. 7 implements 614 of FIG. 6. In the example shown, in 700, it is determined whether to use audio data to aid driver identification. In various embodiments, audio data is used to aid driver identification in the event that image data is not sufficient to perform driver identification, in the event that a previous driver identification was rejected (e.g., indicated by the driver to be incorrect), in the event the system is configured to use audio data to aid driver identification, or for any other appropriate reason. In the event it is determined in 700 to use audio data to aid driver identification, control passes to 704. In the event it is determined in 700 not to use audio data to aid driver identification, control passes to 702. In 702, driver identification is performed using image recognition, and the process then ends. In 704, is determined whether to request a voice sample. In some embodiments, it is determined to request a voice sample in the event it is determined to be unlikely to receive a high quality voice sample any other way. In the event it is determined not to request a voice sample, control passes to 710. In the event it is determined to request a voice sample, control passes to 706. In 706, a voice sample is requested. In 708, a voice sample is received. Control then passes to 714. In 710, it is determined whether a voice sample is already stored. In various embodiments, a voice sample is stored from a previous driver identification attempt, from an identification of a driver voice in ambient audio, from a driver identification conformation, or from any other appropriate voice sample. In the event it is determined that a voice sample is already stored, control passes to 714. In the event it is determined that a voice sample is not already stored, control passes to 712. In 712, an ambient voice sample is determined. In some embodiments, determining an ambient voice sample comprises recording interior audio until an audio segment is captured that is determined to include the driver voice. In 714, voice parameters are extracted from the voice sample. In some embodiments, voice parameters comprise voice recognition parameters. In various embodiments, voice recognition parameters comprise formant strengths, tone patterns, pitch patterns, or any other appropriate voice recognition parameters. In 716, driver identification is performed using image recognition and voice recognition.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capturing an image of a driver, comprising:
   an inward facing camera mounted to a rear view mirror of a vehicle;
   an input interface to receive sensor data associated with the vehicle, and
   a processor to:
   determine whether to capture a driver image using the inward facing camera based at least in part on the sensor data, wherein it is determined to capture the driver image in response to the sensor data indicating the driver is likely to be looking in the direction of the camera; and
   in response to determining to capture the driver image:
   indicate to capture the driver image;
   receive the driver image;
   store the driver image;
   determine whether to extract image recognition parameters from the driver image locally with the processor or with a vehicle data server;
   in response to determining to extract the image recognition parameters from the driver image locally:
   extract the image recognition parameters from the driver image;
   determine whether to perform image recognition locally with the processor or with the vehicle data server;
   in response to determining to perform image recognition locally:
   perform driver identification, wherein the processor determines a driver identification based at least in part on the extracted image recognition parameters;
   prompt a driver of the vehicle to confirm the driver identification;
   receive a response to the prompt, wherein the response to the prompt comprises an indication that the driver identification is correct or an indication that the driver identification is not correct; and
   in response to the indication being the driver identification is incorrect, increase a count of a number of attempts to confirm the driver identification by one.

2. The system of claim 1, wherein the sensor data comprises lane marker data.

3. The system of claim 2, wherein the lane marker data is determined from video data, vehicle lane detection data, or LIDAR data.

4. The system of claim 2, wherein it is determined to capture the driver image in the event that the lane marker data indicates the vehicle is turning right.

5. The system of claim 1, wherein the sensor data comprises accelerometer data.

6. The system of claim 5, wherein it is determined to capture the driver image in the event that the accelerometer data indicates that the vehicle is turning right.

7. The system of claim 1, wherein the sensor data comprises vehicle speed data.

8. The system of claim 7, wherein vehicle speed data comprises speedometer data.

9. The system of claim 1, wherein the sensor data comprises turn signal data.

10. The system of claim 9, wherein it is determined to capture the driver image in response to the turn signal data indicating a right turn and a vehicle speed data indicates the vehicle speed is below a speed threshold.

11. The system of claim 9, wherein it is determined to capture the driver image in response to the turn signal data indicating a left turn and a vehicle speed data indicates the vehicle speed is below a speed threshold.

12. The system of claim 1, wherein the driver identification is aided by audio information.

13. The system of claim 1, wherein the driver is prompted for a voice sample.

14. The system of claim 1, wherein the driver image is stored associated with a set of trip data.

15. The system of claim 1, wherein the image recognition parameters are stored associated with a set of trip data.

16. A method for capturing an image of a driver, comprising:
   receiving sensor data associated with a vehicle;
   determining, using a processor, whether to capture, using an inward facing camera mounted to a rear view mirror of a vehicle, a driver image based at least in part on the sensor data, wherein it is determined to capture the driver image in response to the sensor data indicating the driver is likely to be looking in the direction of the camera; and
   in response to determining to capture the driver image:
   indicating to capture the driver image;
   receiving the driver image;
   storing the driver image;
   determining whether to extract image recognition parameters from the driver image locally with the processor or with a vehicle data server;
   in response to determining to extract the image recognition parameters from the driver image locally:
   extracting the image recognition parameters from the driver image;
   determining whether to perform image recognition locally with the processor or with the vehicle data server;
   in response to determining to perform image recognition locally:
   perform driver identification, wherein the processor determines a driver identification based at least in part on the extracted image recognition parameters;
   prompting a driver of the vehicle to confirm the driver identification;
   receiving a response to the prompt, wherein the response to the prompt comprises an indication that the driver identification is correct or an indication that the driver identification is not correct; and
   in response to the indication being the driver identification is incorrect, increasing a count of a number of attempts to confirm the driver identification by one.

17. A computer program product for capturing an image of a driver of a vehicle, the computer program product being embodied in a non-transitory computer readable storage medium and comprising computer instructions for:
   receiving sensor data associated with a vehicle;
   determining whether to capture, using an inward facing camera mounted to a rear view mirror of a vehicle, a driver image based at least in part on the sensor data, wherein it is determined to capture the driver image in response to the sensor data indicating the driver is likely to be looking in the direction of the camera; and
   in response to determining to capture the driver image:
   indicating to capture the driver image;
   receiving the driver image;
   storing the driver image;
   determining whether to extract image recognition parameters from the driver image locally with the processor or with a vehicle data server;
   in response to determining to extract the image recognition parameters from the driver image locally:

extracting the image recognition parameters from the driver image
determining whether to perform image recognition locally with the processor or with the vehicle data server;
in response to determining to perform image recognition locally:
performing driver identification, wherein the processor determines a driver identification based at least in part on the extracted image recognition parameters;
prompting a driver of the vehicle to confirm the driver identification;
receiving a response to the prompt wherein the response to the prompt comprises an indication that the driver identification is correct or an indication that the driver identification is not correct: and
in response to the indication being the driver identification is incorrect increasing a count of a number of attempts to confirm the driver identification by one.

18. The system of claim 1, wherein in response to determining to extract the image recognition parameters from the driver image, the processor is further to store the image recognition parameters.

* * * * *